United States Patent [19]

Barnhouser

[11] 4,166,036

[45] Aug. 28, 1979

[54] FLOATING SKIMMING APPARATUS

[75] Inventor: Martin Barnhouser, Millersville, Md.

[73] Assignee: Environmental Elements Corporation, Baltimore, Md.

[21] Appl. No.: 604,432

[22] Filed: Aug. 13, 1975

[51] Int. Cl.² .............................................. E02B 15/04
[52] U.S. Cl. ................................. 210/242 R; 210/275; 210/527
[58] Field of Search ................. 210/80, 108, 141, 293, 210/83, 221, 271, 242, 275, 523, 525, 527; 134/10, 109; 209/387, 487, 385, 379; 266/37; 56/8, 9

[56] References Cited

U.S. PATENT DOCUMENTS

| 61,880 | 2/1867 | Serrell | 210/523 X |
|---|---|---|---|
| 1,080,144 | 12/1913 | Ennis | 56/9 |
| 2,146,542 | 2/1939 | Hawley | 210/242 R X |
| 2,327,726 | 8/1943 | Lose, Jr. | 210/271 |
| 2,335,749 | 11/1943 | Fraser | 210/271 |
| 2,497,177 | 2/1950 | McClintock et al. | 210/242 X |
| 2,610,459 | 9/1952 | MacKenzie | 56/8 |
| 3,239,061 | 3/1966 | Horning et al. | 210/80 |
| 3,327,867 | 6/1967 | Hikes | 210/525 |
| 3,333,704 | 8/1967 | McGiven et al. | 210/242 |
| 3,546,858 | 12/1970 | Chaplin | 56/9 |
| 3,688,909 | 9/1972 | Titus | 210/242 |
| 3,753,497 | 8/1973 | Hoffman | 210/DIG. 21 |
| 3,756,414 | 9/1973 | Crisafulli | 210/242 |
| 3,769,207 | 10/1973 | Baer | 210/523 |
| 3,796,658 | 3/1974 | Meissner, Sr. | 210/242 |
| 3,872,017 | 3/1975 | Bishop | 210/527 |
| 3,931,740 | 1/1976 | Carter | 210/242 |
| 4,014,795 | 3/1977 | Veld | 210/242 |

FOREIGN PATENT DOCUMENTS

| 1918887 | 10/1970 | Fed. Rep. of Germany | 210/523 |
|---|---|---|---|
| 430854 | 6/1935 | United Kingdom | 210/523 |

Primary Examiner—Theodore A. Granger
Attorney, Agent, or Firm—Herbert J. Zeh, Jr.; Oscar B. Brumback

[57] ABSTRACT

Herein disclosed is a floating skimming apparatus for removal of contaminated particles from the surface of a liquid contained in a tank. The floating skimming apparatus comprises a deflecting chamber extending substantially the width of the tank, movable along the length of the tank, and has at least one vertex for collecting deflected contaminated particles upon movement of the deflecting chamber. Flotation collars are connected to the deflecting chamber for continuously maintaining a portion of the deflecting chamber above the surface of the liquid. An evacuation device is connected to the deflecting chamber at the vertex for collecting the contaminated particles and removing the contaminated particles from the tank.

12 Claims, 4 Drawing Figures

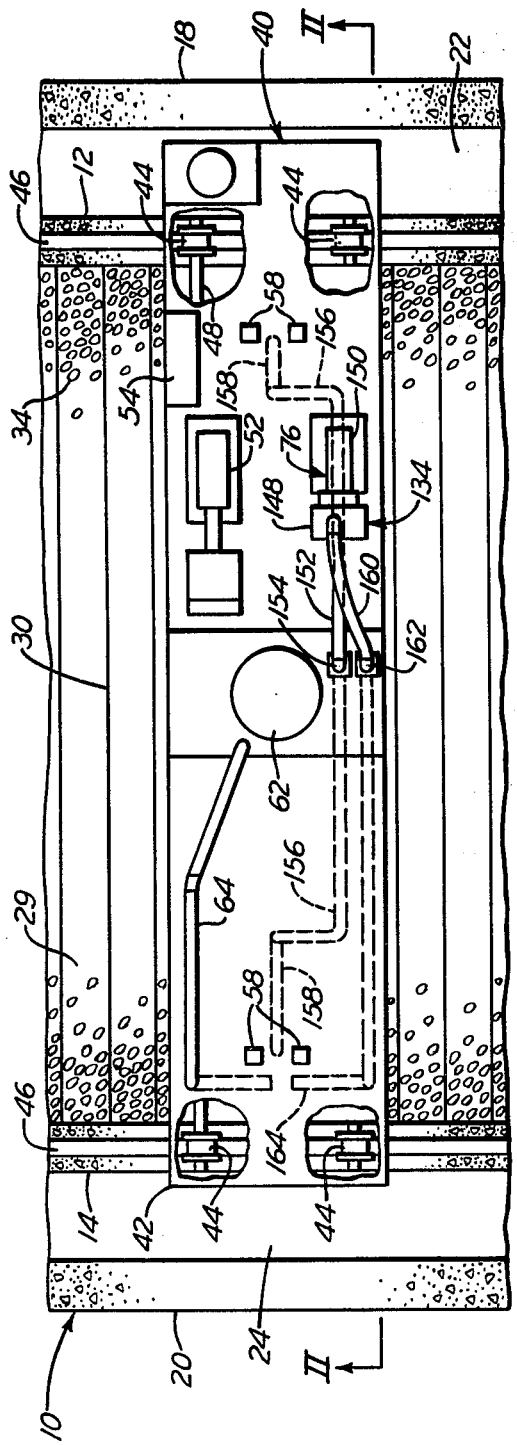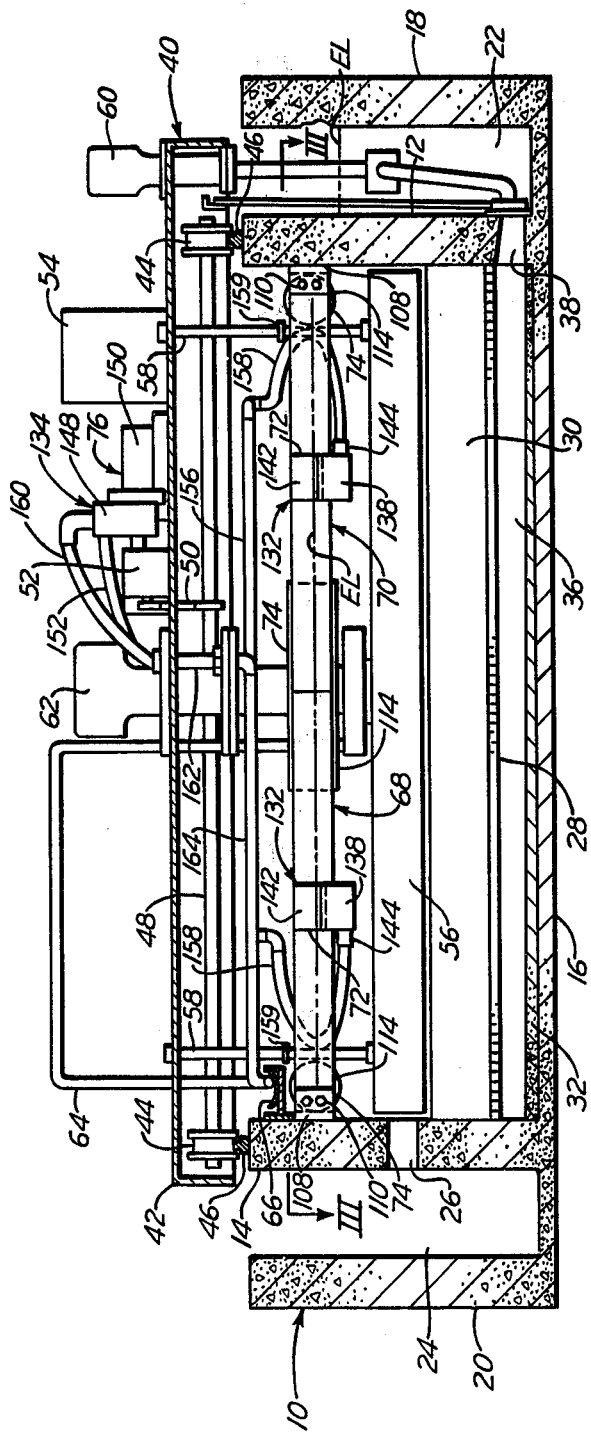

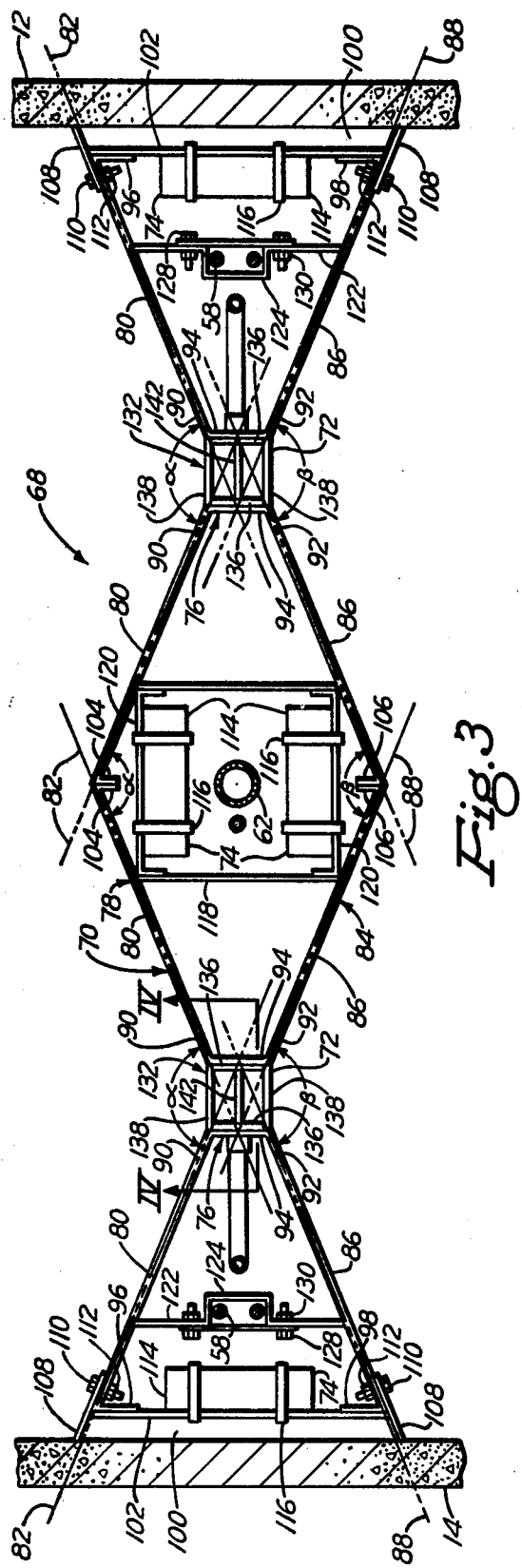
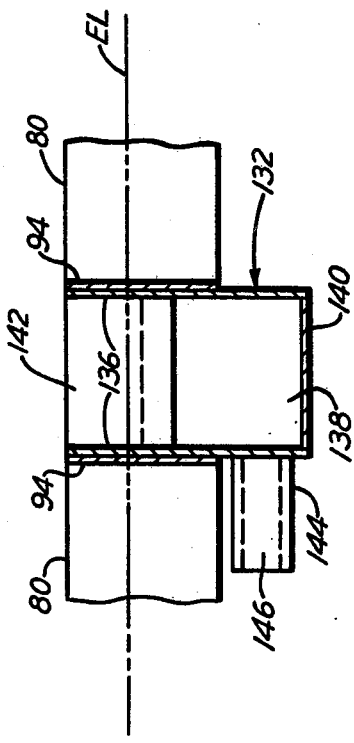

FLOATING SKIMMING APPARATUS

BACKGROUND OF THE INVENTION

1. Field of the Invention

This invention generally relates to liquid purification, and more particularly to a floating skimming apparatus having a movable deflecting chamber for deflecting contaminated particles to a vertex where the contaminated particles are collected and removed.

2. Description of the Prior Art

In typical liquid treatment systems a filtering tank is used to remove foreign particles from a contaminated liquid prior to the liquid being used for human consumption or dumped in rivers, lakes or oceans. Although the filtering tank removes the contaminated particles from the contaminated liquid and is capable of purifying the liquid to a high degree, light particles tend to float on the top of the liquid and tends to form scum on the surface of the liquid. Although the floating particles and scum present little problem to the actual purification of the liquid, it will become unsightly and in time will begin to smell if allowed to accumulate on the surface of the liquid. In addition, the floating particles and scum may clog and damage the various mechanical devices that are associated with a typical filtering tank if they are allowed to collect on the surface of the liquid. Thus, it is common practice to remove the floating particles and scum from the surface of the liquid in the filtering tanks.

A number of skimming apparatuses are used for skimming the surface of the liquid in a filtering tank for removing the floating particles and scum therefrom. Almost all such skimming apparatuses are rigidly secured to a movable device which traverses the length of the tank. All such skimming apparatuses have a distinct disadvantage in that the liquid level within the tank must be maintained at a specific level so that a portion of the skimmer is above the surface of the liquid and a portion is submerged below the surface of the liquid. Thus, if the liquid level is too high the entire skimmer is submerged below the surface of the liquid and the floating particles and scum will flow over the top of the skimmer. Conversely, if the liquid level in the tank is too low the floating particles and scum will flow underneath the skimmer. In either case, the floating particles and scum on the surface of the liquid cannot be removed by the skimmer.

One such type of skimmer includes a straight blade which extends substantially the width tank and is rigidly secured at a specific liquid level to a movable device that traverses the length of the tank. Additionally, at one end of the tank a trough is conventionally formed in the tank at a certain specified liquid level. Thus, as the movable device moves toward the end of the tank where the trough is located the skimmer blade pushes the floating particles and scum toward the end of the tank. As the skimmer blade approaches the tank it pushes the floating particles and scum into the trough and the floating particles and scum are removed by the trough to a disposal area outside the tank. Again, as previously mentioned, the disadvantage of such a skimming blade is that it is dependant upon a specific liquid level being maintained within the tank and, additionally, it can only skim the surface of the liquid in the direction where the trough is located. Further, it has been found that not all the floating particles and scum will enter the trough prior to the blade moving in the opposite direction. Thus, some floating particles and scum will remain upon the surface of the liquid at all times.

A second type of skimmer is conventionally called a vortex skimmer and uses a cone located at one end of the tank. The vortex skimmer cone is located at a specific liquid level in the tank. In addition, a straight blade is rigidly secured at the desired liquid level. A movable device moves the blade across the tank toward the vortex cone and the skimmer blade pushes the floating particles and scum into the cone and the floating particles and scum spiral downward into the cone and are disposed of outside the tank. Again, a disadvantage of such a skimming apparatus is that it can only be used at a specific liquid level and not all the floating particles and scum will flow into the vortex skimming cone thus leaving some floating particles and scum on the surface of the liquid.

Another type skimming apparatus uses a beach at one end of the tank which rises above the surface of the liquid and ends in a trough. Again, a straight blade is rigidly secured to a movable device that moves the blade along the length of the tank. Again, both the blade and the beach are secured at a specific liquid level. When the movable device moves the skimmer toward the end of the tank where the beach is located the blade pushes the floating particles and scum into the trough. This type of skimming apparatus has a further disadvantage in that as the blade rides up the beach for dumping the floating particles and scum into the trough the smaller particles and scum will flow back down the beach between the beach and the blade and remain upon the surface of the liquid. This is particularly true where oily substances are being skimmed.

Other types of rigidly secured blade type skimmers that are used in filters and clarifiers are shown in Shaffer U.S. Pat. No. 3,864,257 and Quast et al U.S. Pat. No. 3,770,132. These type skimmers have the same disadvantage which has been mentioned above since they are dependant upon a specific liquid level and require a beach mechanism such as shown in Quast et al.

Floating skimmers such as shown in Bagnulo U.S. Pat. No. 3,853,768 and Falxa U.S. Pat. No. 3,876,540 have been developed to skim the surface of floating particles and scum independent of the liquid level within the tank. Such devices float on the surface of the water and are partially submerged. The floating particles and scum flow into the floating skimmer and are removed therefrom. However, such devices have a distinct disadvantage in that they are unable to skim the entire surface of the liquid in the tank. They merely float around a portion of the tank and thus there will be portions of the tank that the floating skimmer may not reach, thus some floating particles and scum will remain on the surface of the liquid at all times.

SUMMARY OF THE INVENTION

Accordingly, an object of the present invention is to provide a skimming apparatus that will overcome the aforementioned disadvantages and others. Thus, this invention provides a floating skimming apparatus that will remove floating particles and scum from the surface of the liquid independent of the liquid level in the tank and is movable across the length of the tank to insure that the entire surface of the liquid is cleaned.

The apparatus for accomplishing the above objects is a floating skimming apparatus for removal of contaminated particles from the surface of a liquid contained in a tank, comprising: a deflecting chamber means extending substantially the width of the tank, movable along the length of the tank, and having at least one vertex for collecting deflected contaminated particles upon movement of the deflecting chamber means; a floatation means connected to the deflecting chamber means for continuously maintaining a portion of the deflecting chamber means above the surface of the liquid; and an evacuation means connected to the deflecting chamber means at the vertex for collecting the contaminated particles and removing the contaminated particles from the tank.

The above and further objects and novel features of the invention will appear more fully in the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings, wherein like parts are marked alike:

FIG. 1 is a top view of a portion of a filtering tank utilizing the present invention and illustrating the backwashing apparatus for cleaning the filter bed, the movable carriage along the top of the filtering tank for moving the floating skimming apparatus along the length of the tank, and the suction means located on the carriage for removing the contaminated particles from the surface of the liquid;

FIG. 2 is a cross sectional view of the filtering tank of FIG. 1 taken along the lines II—II and showing a side view of the floating skimming apparatus of the present invention:

FIG. 3 is a top view of the floating skimming apparatus of FIG. 2 taken along the lines III—III and showing the first and second series of skimming blades, the intake container means, the floatation collars, and the manner in which the floating skimming apparatus is moved along the length of the tank by the carriage; and FIG. 4 is an enlarged cross sectional view of the intake container means of FIG. 3 taken along the lines IV—IV and showing the relationship between the sides of the intake container means and the baffle means.

DESCRIPTION OF THE PREFERRED EMBODIMENT

FIGS. 1 and 2 illustrate a typical environment in which the floating skimming apparatus of the present invention is used. In the environment as shown in FIGS. 1 and 2 the floating skimming apparatus is used to skim floating particles and scum from the surface of a liquid being filtered through a rectangular filtering tank. The filtering tank is used generally to remove foreign particles from a contaminaated liquid for producing substantially clean and purified liquid. The floating skimming apparatus will be described when used in conjunction with a rectangular filtering tank as shown in FIGS. 1 and 2. It should be understood, however, that although the floating skimming apparatus is illustrated as used in conjunction with a filtering tank it can be used in any application where the surface of a liquid must be skimmed for removal of floating particles and scum thereon. Thus, it is not intended that the floating skimming apparatus be limited to rectangular filtering tanks but may also be used with all types of filtering apparatuses and with clarifiers and thickeners.

The filtering tank and associated apparatus as illustrated in FIGS. 1 and 2 is fully described in C. S. Horning et al U.S. Pat. No. 3,239,061 and therefore will not be described in detail except where necessary to explain the floating skimming apparatus of the present invention. Generally, however, a filtering tank, denoted generally as numeral 10, is defined by opposite parallel sidewalls 12 and 14 connected by a bottom 16, all of which preferably are formed from concrete, but it should be understood that other forms of material such as metal and reinforced plastic may also be used to form tank 10. Desposed along sidewalls 12 and 14 of filtering tank 10 are additional outer walls 18 and 20. Although not shown in FIGS. 1 and 2, it should be understood that tank 10 has opposite end walls and in its preferred construction tank 10 is generally rectangular in shape.

Walls 12 and 18 cooperate to form therebetween an effluent channel 22, and walls 14 and 20 cooperate to form therebetween an influent channel 24. Contaminated liquid to be filtered is directed into influent channel 24 in the known manner and discharges therefrom through a series of suitable inlet ports 26, which are formed in wall 14, into filtering tank 10.

A filter media support means includes a layer of conventional porous material consisting of blocks, sheets or plates 28 supported above bottom 16 along a substantially horizontal plane. Tank 10 is divided into transversally extending compartments 29 by partitions or walls 30 which extend downward through supports 28 to the top of sloping surface 32 of bottom 16, thus forming transversally extending passages 36 beneath supports 28 and between walls 30. Walls 30 are preferrably impervious vertical plates extending between walls 12 and 14. Surface 32 slopes gradually downward from wall 14 toward wall 12 so that the filtered water drains toward wall 12.

A layer of suitable filtering material 34 which is capable of filtering out the contaminated particles and impurities within the contaminated liquid is supported by the layer of porous support material 28. The type of filtering material 34 to be used in filtering tank 10 may be of any filtering material that is suitable to the requirements of the system. Filter sand may be used as the filtering material 34 where suspended particles in the contaminated liquid are to be removed. When dissolved contaminates within the contaminated liquid must be removed a filter material such as granular activated carbon may be used instead of sand. Where both suspended particles and dissolved contaminates must be removed a combination of filter material such as sand and activated carbon may be used in conjunction with each other to remove the contaminates from the liquid.

Contaminated liquid which enters tank 10 through inlet ports 26 percolates through filtering material 34, passes through the layer of porous support material 28, and drains into the liquid receiving means 36 which actually comprises passages defined by the parallel dividing walls 30. The length of passages 36 are determined by walls 12 and 14. One end of each passage 36 is closed by wall 14 while the opposite end of each passage 36 communicates with a discharge port 38 which forms a horizontal row of outlet ports (not shown) in the lower portion of wall 12.

Referring again to FIGS. 1 and 2 after the contaminated liquid filters through filter material 34, filter material 34 becomes caked and encrusted by the entrapped contaminated particles which have been removed from the contaminated liquid. Thus, filter material 34 must be periodically cleaned of these entrapped particles so that filtering may continue within filtering tank 10. A typical method of cleaning filter material 34 is to backwash filter material 34 to loosen and separate the entrapped particles from filter material 34 and then to remove the loosened particles from filtering tank 10. A backwashing apparatus, denoted generally by numeral 40, is used to backwash filter material 34 and to remove the entrapped contaminated particles from filtering tank 10.

Backwashing apparatus 40 which is used in conjunction with filtering tank 10 is fully described in C. S. Horning U.S. Pat. No. 3,239,061, and therefore will not be described in detail herein. However, in general, backwashing means 40 includes a movable carriage 42 which spans the width of sidewalls 12 and 14. Carriage 42 includes two pair of wheels 44 which are mounted on a pair of rails 46 secured, in the usual manner, to the top of sidewalls 12 and 14. The pair of rear wheels 44 are connected by a drive shaft 48 which is in turn connected by a chain 50 to a driving motor and gear reducing mechanism 52. Drive motor and gear reducing mechanism 52 is electrically connected to a control panel 54 which is operated by the operator. Thus, when the operator desires to move the carriage the length of tank 10 he activates control panel 54, which energizes motor and gear reducer apparatus 52 which in turn rotates drive shaft 48 and rear wheels 44. Thus, carriage 42 is propelled along the length of tank 10 on rails 46. Suspended from carriage 42 below the level of the liquid, designated EL, is an inverted trough 56 which spans substantially the width of sidewalls 12 and 14 and is located slightly above panel walls 30. The width of trough 56 is substantially greater than the distance between adjacent sidewalls 30 so that each compartment 29 between adjacent sidewalls 30 can be isolated from adjacent compartments 29. Trough 56 is suspended from carriage 42 at the proper height by support rods 58 which are connected such as by welding or bolting (not shown) to the top of carriage 42 and to the top of trough 56.

Backwashing apparatus 40 further includes a backwashing motor and pump 60 which is supported on the end of carriage 42 which extends over effluent channel 22. Backwashing motor and pump 60 when activated from control panel 54 forces the effluent water from effluent channel 22 back through passages 36, up through support plates 28, and back up through filter material 34. This backwashing action expands filter material 34 within compartment 29 and separates and breaks loose the encrusted and entrapped particles from filter material 34.

A suction motor and pump apparatus 62 is substantially centered on and supported upon carriage 42 and is connected to trough 56. When suction pump and motor 62 is activated by control panel 54 it sucks up the contaminated particles broken loose from filter material 34 and sucks them up within trough 56. The contaminated particles are then pumped through pipe 64 and into a removal trough 66 located above liquid level EL for disposal thereof outside tank 10. When it is determined that backwashing is needed the operator activates motor and gear reducer 52 which moves carriage 42 over compartment 29 which is to be cleaned. When compartment 29 is isolated by trough 56 the backwashing operation is commenced until filter material 34 in isolated compartment 29 is cleaned. When cleaning is completed the operator then moves carriage 42 to the next compartment 29 to be cleaned.

Although the above apparatus effectively and efficiently cleans filter material 34 of substantially all entrapped foreign particles it is unable to clean the surface of the liquid of floating particles and scum that collect thereon. Thus, a floating skimming apparatus is utilized in conjunction with the backwashing apparatus to remove the floating particles and scum from the surface of the liquid.

Referring to FIGS. 1, 2, and 3, a floating skimming apparatus, denoted generally by numeral 68, is used for removal of the floating particles and scum from the surface of the liquid contained in tank 10. Floating skimming apparatus 68 generally comprises a deflecting chamber means, denoted generally by numeral 70, which extends substantially the width of tank 10 between sidewalls 12 and 14. Deflecting chamber means 70 is movable along the length of tank 10 and has at least one vertex 72 for collecting deflected contaminated particles upon movement of deflecting chamber means 70. Floating skimming apparatus 68 further includes a floatation means 74 connected to deflecting chamber means 70 for continuously maintaining a portion of deflecting chamber means 70 above the surface of the liquid. Floating skimming apparatus 68 further includes an evacuation means, denoted generally by numeral 76, connected to deflecting chamber means 70 at the vertex 72 for collecting the floating particles and scum and removing them from tank 10.

More specifically and referring to FIGS. 2 and 3, deflecting chamber means 70 includes a first series, denoted generally as numeral 78, of skimming blades 80 connected as alternating alterations substantially the width of tank 10 so that the longitudinal axes 82 of two adjacent skimming blades 80 form an angle $\alpha$ at the intersection of adjacent skimming blades 80. Deflecting chamber means 70 further includes a second series, denoted generally by numeral 84, of skimming blade 86 connected as alternating alterations substantially the width of tank 10 so that the longitudinal axes 88 of two adjacent skimming blades 86 form an angle $\beta$ at the intersection of adjacent skimming blades 86. First and second series 78 and 84 of skimming blades 80 and 86 respectively are oppositely opposed and connected at the intersection between adjacent skimming blades 80 of first series 78 and adjacent skimming blades 86 of second series 84 for forming vertexes 72.

Referring to FIG. 3, it is preferred that deflecting chamber means 70 be constructed with two vertexes 72 longitudinally spaced from one another and formed by four skimming blades 80 and four skimming blades 86. Although two vertexes 72 are preferred, which are formed by four skimming blades 80 and four skimming blades 86, it should be understood that any number of skimming blades 80 and 86 and any number of vertexes 72 may be used in forming deflecting chamber means 70. The number of skimming blades 80 and 86 and vertexes 72 used will depend upon the size and individual characteristics of filtering tank 10.

Referring again to FIGS. 2 and 3, it is preferred that ends 90 of adjacent skimming blades 80 and ends 92 of adjacent skimming blades 86 be longitudinally spaced a substantial amount thus forming a space therebetween. In addition, it is preferred that ends 90 and 92 of oppositely opposed skimming blades 80 and 86 be spaced substantial amount forming a space between ends 90 and 92. It is preferred that the space between ends 90 of adjacent skimming blades 80 and ends 92 of adjacent skimming blades 86 be substantially the same as the space between oppositely opposed ends 90 and 92 of oppositely opposed skimming blades 80 and 86. Oppositely opposed ends 90 and 92 of skimming blades 80 and 86 respectively are connected by a plate 94 thus connecting oppositely opposed skimming blades 80 and 86 together. It is preferred that plate 94 be made as an intergral part of oppositely skimming blades 80 and 86, however, if desired plate 94 may be separate and secured to ends 90 and 92 of oppositely opposed skimming blades 80 and 86 respectively such as by welding.

Ends 96 and ends 98 of outermost skimming blades 80 and 86 respectively are spaced from walls 12 and 14 of tank 10, thus leaving a space 100 between ends 96 and 98 and sidewalls 12 and 14. A stiffener plate 102 is connected such as by welding or bolting (not shown) to the ends 96 and 98 of skimming blades 80 and 86 respectively and are rigidly secured together such as by welding or bolting (not shown).

Deflecting chamber means 70 further includes flexible wiper blades 108 which are secured to ends 96 and 98 of skimming blades 80 and 86 respectively by bolts 110 and nuts 112. Wiper blades 108 extend from ends 96 and 98 of skimming blades 80 and 86 respectively to each sidewall 12 and 14 of tank 10 and are in sliding contact therewith. Wiper blades 108 prevent the floating particles and scum from escaping around the ends of deflecting chamber means 70 through space 100. It is preferred that wiper blades 108 be made out of a flexible material such as rubber so that as deflecting chamber means 70 moves along the length of tank 10 wiper blades 108 are able to flex and thus remain in sliding contact with the surface of sidewalls 12 and 14.

Deflecting chamber means 70 is associated with backwashing means 40 so that when carriage 42 moves along the length of tank 10 on rails 46 deflecting chamber means 70 will also move along the surface of the liquid with carriage 42. However, although deflecting chamber means 70 moves along the surface of the liquid with carriage 42 it will be able to move in the vertical direction independent of backwashing means 40 thus insuring that deflecting chamber means 70 will remain floating on a surface of the liquid no matter what the liquid level EL may be. To provide deflecting chamber means 70 with this characteristic support rods 58 which connect carriage 42 to trough 56 pass between the outermost and oppositely opposed skimmer blades 80 and 86. A rigid plate 122 is secured between oppositely opposed outer skimmer blades 80 and 86 such as by welding and are offset longitudinally a substantial amount from support rods 58. Rigid plate 122 includes an offset portion 124 which surrounds support rods 58. A retainer plate 126 is secured to rigid plate 122 such as by bolts 128 and nuts 130 opposite to offset portion 124 thus, support rods 58 extend through the space between offset portion 124 and retainer plate 126 and is captured by retainer plate 126 and offset portion 124. Thus, when carriage 42 moves along the length of tank 10 support rods 58 will contact offset portion 124 and will move deflecting chamber means 70 along with carriage 42. However, since support rods 58 extend vertically through the space between offset portion 124 and retainer plate 126, deflecting chamber means 70 will move in the vertical direction without any interference between rigid plate 122, retainer plate 126, offset portion 124, and support rods 58.

Floating skimming apparatus 68 further includes floatation means 74 for maintaining a portion of skimming blades 80 and 86 above the surface of the liquid and a portion of skimming blades 80 and 86 below the surface of the liquid. Preferably, floatation means 74 includes a plurality of floatation collars 114 which are secured between skimming blades 80 and 86. A floatation collar 114 is secured such as by straps 116 to stiffener plate 102 connecting ends 96 and 98 of oppositely opposed skimming blades 80 and 86 respectively. Additionally, a floatation collar 114 is secured between innermost adjacent skimming blades 80 of first series 78 and between innermost adjacent skimming blades 86 of second series 84. A pair of spaced stiffener plates 118 are secured such as by welding between oppositely opposed innermost skimming blades 80 and 86. A second pair of spaced stiffener plates 120 are secured between first pair of stiffener plates 118 such as by welding. A floatation collar 114 is secured such as by straps 116 to each second stiffener plate 120. It should be noted that floatation collar 114 which are secured to second stiffener plate 120 must be spaced a sufficient amount to allow suction pump and motor means 62 to pass therebetween so interference does not result.

As shown in FIGS. 2 and 3, it is preferred that floatation collars 114 be cylindrical in shape and have a diameter substantially greater than the thickness of skimming blades 80 and 86. This is to insure that a portion of skimming blades 80 and 86 remain above the surface of the liquid and a portion of skimming blades 80 and 86 remain below the surface of the liquid. Although it is preferred that floatation collars 114 be cylindrical in shape, any shape may be used as long as a portion of skimming blades 80 and 86 remain above and below the surface of the liquid. In addition, floatation collars 114 may be made out of any material which has a lower density than the liquid thus insuring that deflecting chamber means 70 will float upon the surface of the liquid. Although any substance having a lower density than the liquid may be used as floatation collars 114, it is preferred that floatation collars 114 be made from a material such as, for example, STYROFOAM.

Referring now to FIGS. 1, 2, 3, and 4, evacuation means 76 includes an intake container means, denoted generally by numeral 132, which is connected to deflecting chamber means 70 at vertex 72 and below the surface of the liquid. Intake container means 132 has an opening adjacent the surface of the liquid for receiving the floating particles and scum collected at vertex 72. Evacuation means 76 further includes a suction means, denoted generally by numeral 134, which is connected to intake container means 132 for applying suction to intake container means 132 for removing the floating particles and scum collected by intake container means 132.

Referring to FIGS. 2, 3, and 4, intake container means 132 includes side plates 136 having substantially the same width as plates 94 and are secured to each plate 94 such as by welding. Side plates 136 extend from the top of plate 94 to a point substantially below the bottom of plates 94. Spaced end plates 138 are secured such as by welding to the ends of side plates 134 and extend from the bottom of side plates 136 to a point adjacent and below the surface of the liquid. A bottom plate 140 is secured to the bottom of side plates 136 and end plates 138 such as by welding. A baffle plate 142 spans between side plates 136 and is substantially centered between end plates 138. Baffle plates 142 are secured to side plates 136 such as by welding and extends from the top of side plates 136 downward to a point below the top of end plates 138. Thus, the top of intake container means 132 is open and adjacent to the surface of the liquid. Intake container means 132 further includes an outlet nozzle 144 which is rigidly secured to one side plate 134 below the bottom of skimming blades 80 and 86. Outlet nozzle 144 includes an opening 146 extending therethrough and into the interior of intake container means 132.

Referring to FIGS. 1 and 2, suction means 134 includes a conventional suction pump 148 energized by a conventional motor 150 which is mounted on top of carriage 42 such as by welding or bolting (not shown). A flexible hose 152 is connected to an inlet nozzle of suction pump 148 and is connected at the other end to a rigid pipe 154 which is rigidly secured in a known manner such as by bolting (not shown) to the top of carriage 42. Rigid pipe 154 extends downward below the bottom of carriage 42 but above the top of deflecting chamber means 70. A pair of rigid pipes 156 are connected in the conventional manner to rigid pipe 154 and extend along the length of carriage 42 to a point inboard of support rods 58. Flexible hoses 158 are connected at one end to the ends of each rigid pipe 156 and are connected at the other end to outlet nozzles 144 located on intake container means 132. Another flexible hose 160 is connected to an outlet nozzle of suction pump 148 and is connected at the other end to a second rigid pipe 162 which is rigidly secured to the top of carriage 42 in the known manner such as by bolting (not shown) and extends downward to a point below the bottom of carriage 42. A rigid pipe 164 is connected in the conventional manner at one end to rigid pipe 162 and extends along the length of carriage 42 into removal trough 66.

Referring to FIG. 2, stop collars 159 are secured to support rods 58 above deflecting chamber means 70 and below removal trough 66 such as by welding or bolting. Stops collars 159 prevent deflecting chamber means 70 from contacting removal trough 66 and damaging it should the liquid level EL become excessively high.

In operation and referring to FIGS. 1, 2, 3, and 4, the operation of filtering tank 10, carriage 42, backwashing apparatus 40 is fully explained and described in the aforementioned C. S. Horning patent and therefore will not be further described. Only the operation of floating skimming apparatus 68 will be described. When it is determined that removal of floating particles and scum from the surface of the liquid is desired the operator energizes carriage 42 by control panel 54. Upon energizing carriage 42, carriage 42 will traverse along the length of tank 10 on rails 46. Floating skimming apparatus 68 will move along with carriage 42 in the direction of travel of carriage 42 because support rods 58 which are rigidly secured between carriage 42 and trough 56 extends through offset portion 124 which is rigidly secured to deflecting chambers means 70. Deflecting chamber means 70 will float on the surface of the liquid because floatation collars 114 are secured to deflecting chamber means 70 and there is no obstruction to the vertical movement of deflecting chamber means 70 thus, deflecting chamber means 70 can raise vertically along support rods 58 so that deflecting chamber means 70 will always remain at the same level EL as the level EL of the liquid. As carriage 42 traverses the length of tank 10 deflecting chamber means 70 will move along the surface of the liquid. For illustration purposes, it will be assumed that the direction of travel of floating skimming apparatus 68 will be in the direction by which skimming blades 86 will come in contact with the floating particles and scum on the surface of the liquid. It should be understood, however, that floating skimming apparatus 68 will work in both directions so that the floating particles and scum can be removed when carriage 42 traverses in either direction along the length of tank 10. As deflecting chamber means 70 moves in the direction of travel of carriage 42 floating particles and scum on the surface of the liquid will contact skimming blades 86. The floating particles and scum are prevented from escaping around the ends of deflecting chamber means 70 by flexible wiper blades 108 which are secured between the ends of deflecting chamber means 70 and are in contact with sidewalls 12 and 14. As the floating particles and scum contact skimming blades 86 they are deflected toward the vertexes 72 since the adjacent skimming blade 86 are arranged as alternating alterations. As the deflecting chamber means 70 continues to move in the direction of travel more and more of the floating particles and scum are deflected by skimming blades 86 toward each vertex 72.

When the floating particles and scum reach each vertex 72 they are prevented from escaping to the other side of deflecting chamber means 70 by baffle means 142. Thus, the floating particles and scum are collected above intake container means 132. The operator energizes pump motor 150 which energizes suction pump 148. Suction is then created in flexible hose 152, rigid pipe 154, rigid pipes 156, flexible hoses 158, and outlet nozzles 142 mounted on intake container means 132. As a suction is applied to intake container means 132, the floating particles and scum are sucked from the surface of the liquid into intake container means 132. The floating particles and scum are sucked through flexible hoses 158, rigid pipes 156, rigid pipe 154, hose 152, and into suction pump 148. The floating particles and scum are then pumped from suction pump 148 through flexible hose 160, rigid pipe 162, rigid pipe 164, and into removal trough 66 where the floating particles and scum are disposed of in the known manner outside filtering tank 10.

The operation of floating skimming apparatus 68 in the opposite direction of travel than previously described is exactly the same except that the floating particles and scum are deflected to the vertexes 72 and the intake container means 132 by skimming blades 80 rather than skimming blades 86. Since the operation is exactly the same as previously described it will not be further described.

The foregoing has presented a novel floating skimming apparatus to remove floating particles and scum from the surface of a liquid contained in a tank. The problem of having to maintain the liquid level at a precise level in order for the skimmer to remove the floating particles and scum has been eliminated by having the skimming apparatus float on the surface of the liquid and therefore is able to remove the particles no matter what the liquid level may be. The problem associated with skimmers that utilize vortexes at one end of the tank or beaches at one end of the tank has been eliminated by providing the floating skimming apparatus with a deflecting chamber that deflects the floating particles and scum toward a vertex in the deflecting chamber where they are collected and removed by an evacuation means. The problems associated with other types of floating skimmers which merely float upon a limited portion of the surface has been eliminated by having the floating skimmer extend substantially the width of the tank in which the liquid is held and having the floating skimming apparatus moveable along the length of the tank thus insuring that all portions of the liquid in the tank is cleaned of floating particles and scum.

Accordingly, the invention having been described in its best embodiment and mode of operation that which is desired to be claimed by Letters Patent is:

1. An improved liquid treating apparatus including a rectangular tank having an inlet means for supplying liquid to be treated, means for treating the liquid, outlet means for receiving the treated liquid, carriage means above the tank and movable along the length thereof, means for moving the carriage means along the length thereof, means for moving the carriage means along the length of the tank, and skimming means movable with the carriage means for removing contaminated particles from the surface of the liquid in the tank, wherein the improvement comprises skimming means comprising deflecting chamber means extending substantially the width of the tank and movable with the carriage means along the length thereof, the deflecting chamber means having a plurality of vertexes for collecting the floating contaminated particles upon movement of the deflecting chamber, the deflecting chamber means comprising a first series of skimming blades connected as alternating alterations substantially the width of the tank so that the longitudinal axes of two adjacent skimming blades form an angle at the intersection of the adjacent skimming blades, a second series of skimming blades connected as alternating alterations substantially the width of the tank so that the longitudinal axes of two adjacent skimming blades form an angle at the intersection of the adjacent skimming blades, the first and second series of skimming blades being oppositely opposed and connected at the intersection between the adjacent skimming blades of the first series of blades and the adjacent skimming blades of the second series for forming the vertexes, flotation means connected to the deflecting chamber for continuously maintaining a portion of the deflecting chamber means above the surface of the liquid, and evacuation means connected to the deflecting chamber means at the vertexes for removing the contaminated particles.

2. The improved treating apparatus as in claim 1 wherein the first series of skimming blades consists of four blades and the second series of skimming blades consists of four blades.

3. The apparatus of claim 1 wherein said deflecting chamber means further includes flexible wiper means connected to the ends of said deflecting chamber means and in sliding contact with the walls of said tank for preventing said contaminated particles from escaping around the ends of said deflecting chamber means upon movement of said deflecting chamber means along the length of said tank.

4. The apparatus of claim 1 wherein said floatation means includes a plurality of floatation collars spaced along the length of said deflecting chamber means 5. The apparatus of claim 1 wherein said evacuation means includes:
an intake container means connected to said deflecting chamber means at said vertex below the surface of said liquid and having an opening adjacent the surface of said liquid for receiving said contaminated particles collected at said vertex; and
a suction means connected to said intake container means for applying suction to said intake container means for removal of said contaminated particles from said intake container means.

6. The apparatus of claim 5 wherein said suction means includes:
a suction pump remotely positioned from said deflecting chamber means; and
a flexible hose connected between said suction pump and said intake container means.

7. An improved backwashing filter of the type including a rectangular filtering tank divided into compartments, inlet means for supplying liquid to be filtered, means for filtering the liquid, outlet means for receiving the filtered liquid, backwashing means mounted on carriage means and movable along the length of the filter tank with the carriage means, means for moving the carriage means along the length of the tank and skimming means movable with the carriage means for removing contaminated particles from the surface of the liquid in the filter tank, wherein the improvement comprises skimming means comprising deflecting chamber means extending substantially the width of the filter tank and movable with the carriage means along the length thereof, the deflecting chamber means having a plurality of vertexes for collecting the floating contaminated particles upon movement of the deflecting chamber, the deflecting chamber means comprising a first series of skimming blades connected as alternating alterations substantially the width of the tank so that the longitudinal axes of two adjacent skimming blades form an angle at the intersection of the adjacent skimming blades, a second series of skimming blades connected as alternating alterations substantially the width of the tank so that the longitudinal axes of two adjacent skimming blades form an angle at the intersection of the adjacent skimming blades, the first and second series of skimming blades being oppositely opposed and connected at the intersection between the adjacent skimming blades of the first series of blades and the adjacent skimming blades of the second series for forming the vertexes, flotation means connected to the deflecting chamber for continuously maintaining a portion of the deflecting chamber means above the surface of the liquid and evacuation means connected to the deflecting chamber means at the vertexes for removing the contaminated particles.

8. The improved filtering apparatus as in claim 7 wherein the first series of skimming blades consists of four blades and the second series of skimming blades consists of four blades.

9. The apparatus of claim 7 wherein said deflecting chamber means further includes flexible wiper means connected to the ends of said deflecting chamber means and in sliding contact with the walls of said tank for preventing said contaminated particles from escaping around the ends of said deflecting chamber means upon movement of said deflecting chamber means along the length of said tank.

10. The apparatus of claim 7 wherein said floatation means includes a plurality of floatation collars spaced along the length of said deflecting chamber means.

11. The apparatus of claim 7 wherein said evacuation means includes:
an intake container means connected to said deflecting chamber means at said vertex below the surface of said liquid and having an opening adjacent the surface of said liquid for receiving said contaminated particles collected at said vertex; and
a suction means connected to said intake container means for applying suction to said intake container means for removal of said contaminated particles from said intake container means.

12. The apparatus of claim 11 wherein said suction means includes:

a suction pump remotely positioned from said deflecting chamber means; and
a flexible hose connected between said suction pump and said intake container means.

* * * * *

UNITED STATES PATENT AND TRADEMARK OFFICE
CERTIFICATE OF CORRECTION

PATENT NO. : 4,166,036

DATED : August 28, 1979

INVENTOR(S) : Martin Barnhouser

It is certified that error appears in the above—identified patent and that said Letters Patent is hereby corrected as shown below:

Column 11, lines 12-13, delete "means for moving the carriage means along the length thereof".

Signed and Sealed this

Sixteenth Day of December 1980

[SEAL]

Attest:

SIDNEY A. DIAMOND

Attesting Officer

Commissioner of Patents and Trademarks